United States Patent [19]
Powell et al.

[11] Patent Number: 5,150,988
[45] Date of Patent: Sep. 29, 1992

[54] COMBINATION VIBRATOR, AERATOR, AND LIQUID-INJECTION SYSTEM

[76] Inventors: Paul E. Powell, 1801 Westlake Dr., #104, Austin, Tex. 78746; Larry N. Britton, Rte. 3, Box 2140, Spicewood, Tex. 78669

[21] Appl. No.: 654,006

[22] Filed: Feb. 12, 1991

[51] Int. Cl.⁵ .................................................. E02D 3/00
[52] U.S. Cl. ...................................... 405/258; 405/128; 405/269; 405/271
[58] Field of Search ............... 405/73, 74, 128, 129, 405/258, 269, 271; 37/75, 78, DIG. 18

[56] References Cited

U.S. PATENT DOCUMENTS

| | | | |
|---|---|---|---|
| 4,397,590 | 8/1983 | Friesen et al. | 405/271 |
| 4,624,606 | 11/1986 | Nakanishi et al. | 405/269 |
| 4,690,764 | 9/1987 | Okumura et al. | 210/629 |
| 4,786,212 | 11/1988 | Bauer et al. | 405/269 |
| 4,797,212 | 1/1989 | von Nordamskjold | 210/614 |
| 4,842,780 | 6/1989 | Shimada et al. | 405/269 X |

Primary Examiner—David H. Corbin

[57] ABSTRACT

A combination vibrator, aerator, and liquid-injection device for in-situ treatment of sediments to facilitate the reduction, elimination or removal of substances by microbiological or chemical treatment. In the preferred embodiment of the invention, the aerator and liquid-injection elements are attached to an internal concrete vibrator which penetrates and agitates the sediments. Air released from the aerator supplies oxygen to microorganisms in the sediments for the aerobic biodegradation of target substances. Liquids released under pressure from the liquid injector introduce microorganisms, nutrients or other chemicals such as oxidizers and detergents for degradation or solubilization of target substances.

18 Claims, 3 Drawing Sheets

COMBINATION VIBRATOR, AERATOR, AND LIQUID-INJECTION SYSTEM

BACKGROUND OF THE INVENTION

1. Field of the Invention

This invention relates to a device for facilitating the in-situ treatment of sediments, especially the bioremediation of sediments containing hazardous organic wastes, by simultaneously agitating, aerating and introducing nutrients, microorganisms or chemicals such as oxidizing agents or detergents into the sediments.

2. Description of Prior Art

The treatment of sediments containing hazardous wastes has, heretofore, generally involved the removal of the sediments for treatment or for disposal at an approved disposal site. Treatments have included air striping, solvent extraction or microbial degradation of the hazardous material before depositing the sediments in a suitable location (EPA/600/S2-86/112 Mar. 1987). Treatment of sediments has been limited by the lack of an economical device for mixing appropriate microorganisms, nutrients, oxygen or treatment chemicals with the sediments bearing target substances without removing the sediments from their original location. An air chain device was described in U.S. Pat. No. 4,797,212, but the device was designed for use only in wastewater treatment basins and does not provide for the introduction of microorganisms, nutrients or treatment chemicals into the sediments. The air chain would function properly only in soft unconsolidated sediments as its bottom aerators are suspended above the floor of the treatment basin. A device which discharges a mixture of gas and liquid into ambient water for biological treatment is presented in U.S. Pat. No. 4,69764, but it is fixed to the side of treatment basins and no provision is described for it's use in the treatment of sediments.

There is an continuing need for an inexpensive, portable device that can penetrate dense, compact, anaerobic sediments and mix with them oxygen, nutrients and microorganisms, or chemicals such as oxidants and detergents.

SUMMARY OF THE INVENTION

Disclosure of the Invention

The novel combination of multi-orificed, non-jetting gas- and liquid-diffuser elements with a vibrator element as taught by the present invention facilitates the in-situ biological or chemical degradation or solubilization of target substances in compact sediments or submerged soils. The vibrator element loosens, agitates and penetrates the sediments while carrying the attached gas and liquid diffusers into the sediment where they release gaseous oxygen, microorganisms, nutrients or other chemicals.

OBJECTS AND ADVANTAGES

Accordingly, several objects and advantages of our invention are to provide a simple, inexpensive, portable device for the in-situ treatment of sediments containing target substances, such as hazardous organic wastes. The present invention accomplishes bioremediation of sediments and overlying surface waters by penetrating, agitating and aerating the sediments and by the introduction of dissolved nutrients and, where necessary, microorganisms into the in-place sediments. Alternatively, degradative and solubilizing chemicals are introduced into the sediments by application of our invention.

Among the advantages of the invention over current practice are the significant reduction in remediation costs and the elimination of possible off-site contamination when the material is moved or the extracted substances disposed of. Use of the present invention stimulates the growth of autochthonous microorganisms already adapted to the hazardous chemicals and to the local conditions which, in most cases, obviates the necessity of introducing foreign microorganisms.

Because most of the microbial biomass is associated with sediment particles, the resulting interstitial water has low nutrient concentration and low biological oxygen demand following fixation of the nutrients by the biomass and settling of sediment particles. Hazardous chemicals and excess nutrients dissolved in the surface water are removed by circulating surface water through the sediment via the device's liquid-feed line.

Alternating sequences of aerobic, microaerobic and anaerobic conditions are created in the sediments by periodic application of the device. The full range of microorganisms present is thus utilized for such biodegradative activities as the aerobic and anaerobic dehalogenation of chlorinated hydrocarbons and the nitrification and denitrification of organic nitrogen.

Further objects and advantages of our invention will become apparent from a consideration of the drawings and ensuing description of it.

List of Reference Numerals

1—vibrator element
2—gas-diffuser element
3—liquid-diffuser element
20—vibrator power cable
22—liquid-feed line
24—compressed-gas line
25A—internal gas-diffuser tube
25B—internal liquid-diffuser tube
26A—gas-line connector
26B—liquid-feed line connector
27A—gas-diffuser nipple
27B—liquid-diffuser nipple
28A—external gas-diffuser tube
28B—external liquid-diffuser tube
30A—hose clamp
30B—hose clamp
32A—rubber sleeve
32B—rubber sleeve
32C—rubber sleeve
32D—rubber sleeve
34A—gas-diffuser cap
34B—liquid-diffuser cap 36—vibrator head
38—hose clamp
40—abrasive sheath

DESCRIPTION OF THE PREFERRED EMBODIMENTS

Description of the Device

Figure 1:
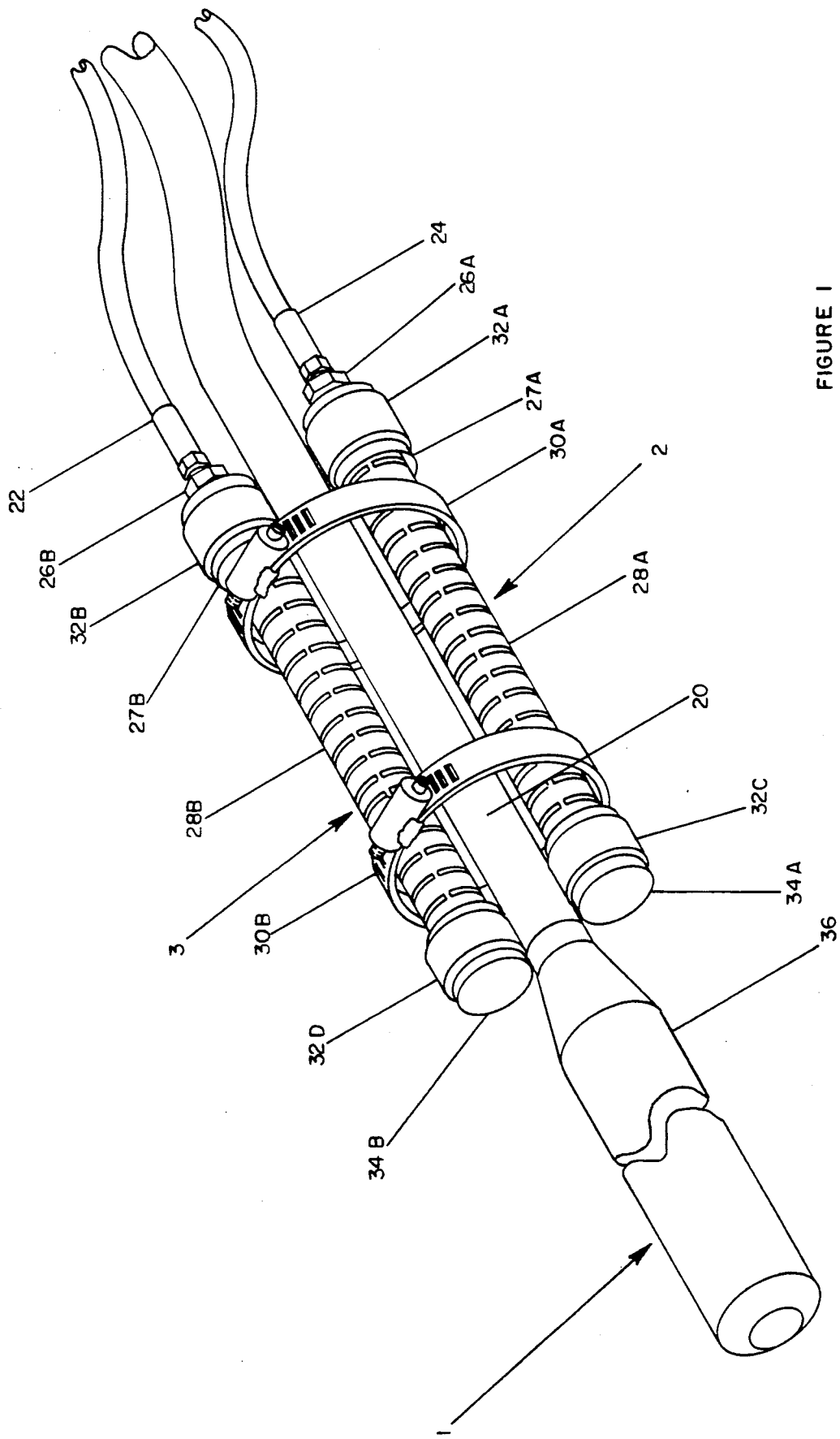
FIG. 1 is a perspective view of the preferred embodiment of our invention showing the relationship among the vibrator, and compressed-gas and liquid-feed lines with diffuser elements.
Figure 2:
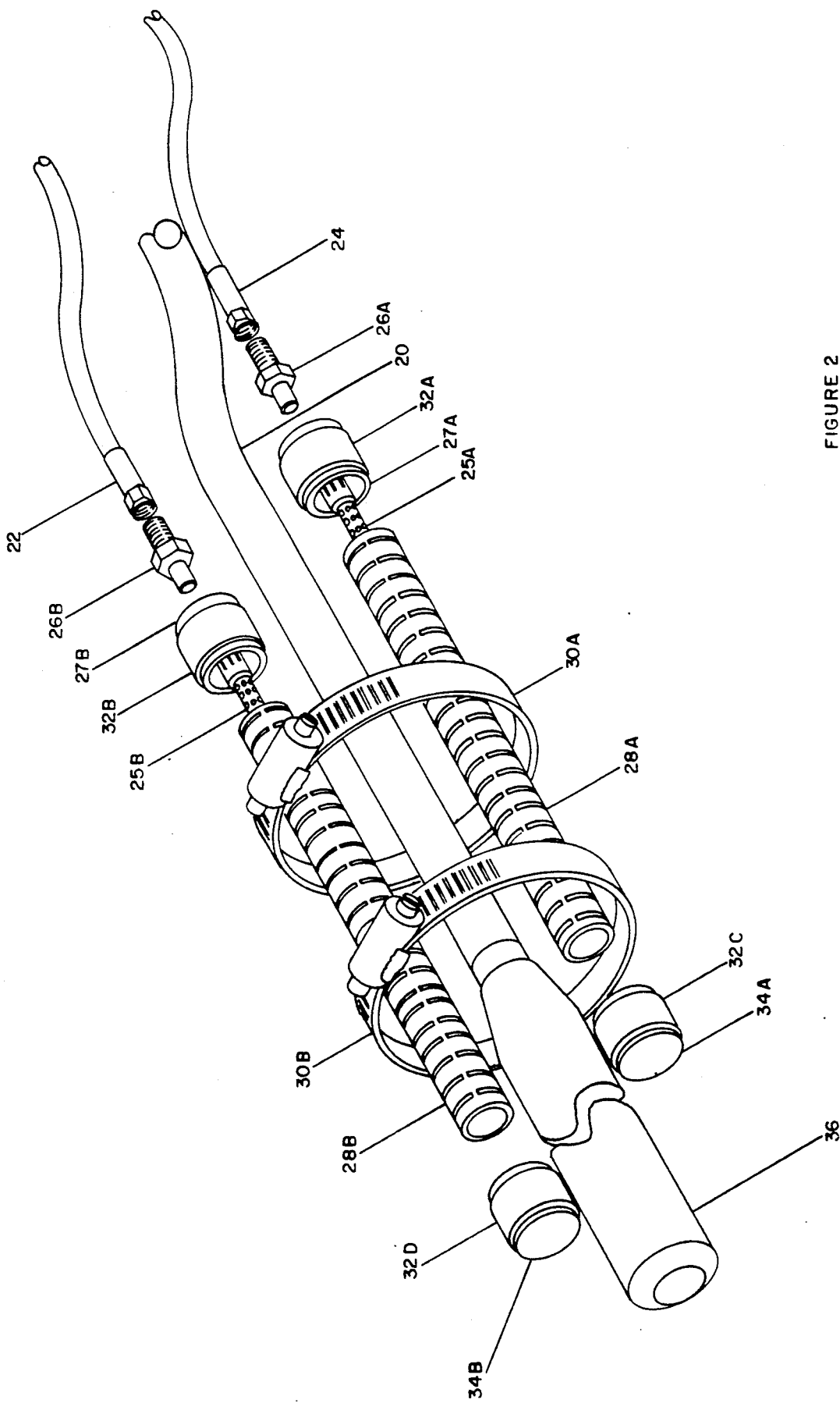
FIG. 2 shows a detailed exploded view of the vibrator, compressed-gas and liquid-feed lines and the components of the diffuser elements with the means of attachment of the various parts.

FIGS. 1 and 2 show the combination vibrator, aerator and liquid injector according to the preferred embodiment of the invention. This version of the device includes a vibration means consisting of an internal concrete vibrator, vibrator element 1, including a motor (not shown), and a power cable 20 connected to a vibrator head 36; an aeration means consisting of a compressed-gas line 24 connected to a gas-diffuser element 2 comprising a gas-line connector 26A attached to an internal diffuser tube 25A and to a nipple 27A mounted on an external diffuser tube 28A closed by a cap 34A; and a liquid-injection means consisting of a liquid-feed line 22 connected to a liquid-diffuser element 3 comprising a liquid-feed line connector 26B attached to an internal diffuser tube 25B and to a nipple 27B mounted on an external diffuser tube 28B closed by a cap 34B. The gas diffuser element and the liquid-diffuser element are attached parallel to the vibrator power cable immediately proximal to the vibrator head by hose clamps 30A and 30B which are located over the diffuser nipple and cap elements. Sleeves 32A, 32B, 32C and 32D are positioned on the diffuser nipple and cap elements in such manner that the diffusers do not directly contact the vibrator power cable or the hose clamps.

Figure 3:
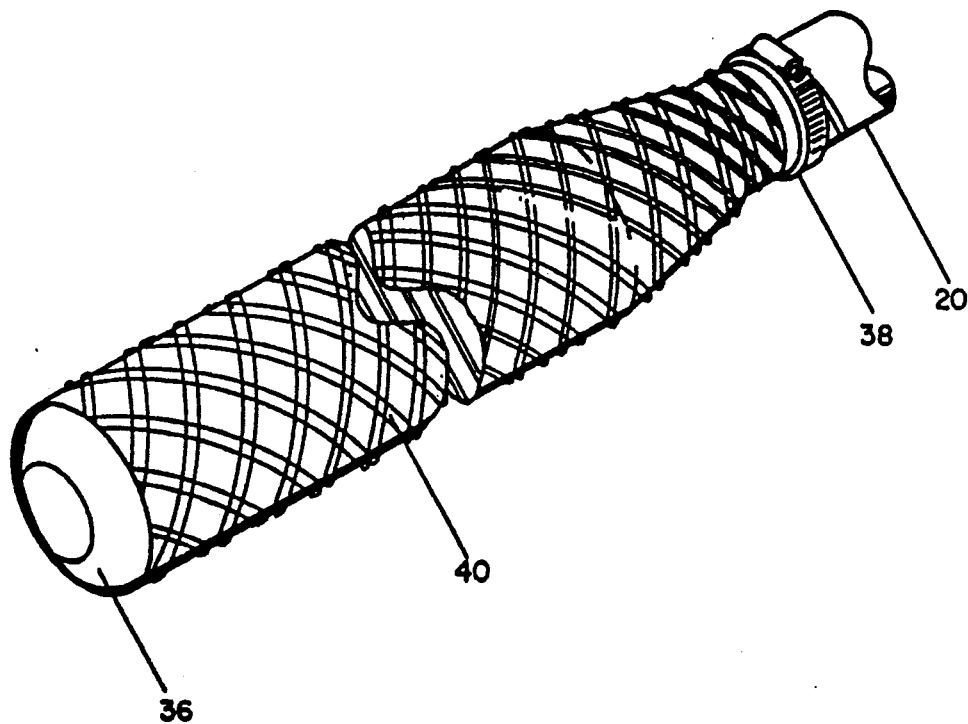
FIG. 3 illustrates the optional abrasive sheath which may invest the vibrator head when the devise is used in very compact sediments, for example, when creating aqueous suspensions of previously dry soils.

FIG. 3 shows the vibrator head 36 invested by the optional abrasive sheath 40 of geo-grid material which is attached to the vibrator head by hose clamp 38. The vibrator power cable 20 connected to the vibrator head is also shown.

A sonicator head is used in place of the concrete vibrator head in another embodiment of the invention.

The device can be assembled in single or multiple unit configurations. Various attachments such as guidance control mechanisms, and retrieval safety cables can be conceived of to improve performance in particular circumstances.

Operation of Invention

The combination vibrator, aerator and liquid injector can be operated as a vibrator/aerator when sediments contain sufficient nutrients and appropriate autochthonous microorganisms or it can be operated as a vibrator/liquid injector when the activity of anaerobic microorganisms requires the stimulation provided by additional nutrients or when an in-situ chemical treatment such as oxidation or solubilization by detergents is desired. Its most common application, however, is as a combination vibrator/aerator/liquid injector for the simultaneous introduction of oxygen and nutrients into sediments or aqueous suspensions of soils.

To introduce the desired oxygen, nutrients, microorganisms, chemicals or combinations of these agents into sediment the vibrator component of the preferred embodiment of the invention is operated as in its usual application, the removal of air pockets from concrete. The vibrator power source (not shown) whether an electric motor, gasoline engine, air compressor, or liquid pump is turned on. Rotational torque is transmitted to an eccentric element within the vibrator head 36 via the vibrator power cable 20. The vibrator head is lowered to the surface of the sediment and moves downward into the sediment as a result of its vibration. The attached aeration means and liquid-injection means are carried into the sediment by the action of the vibrator head.

Oxygen is released into the sediment with the passage of compressed air from the compressed-air source (not show) via the compressed-air line 24 and gas-diffuser element 2. The pressure of the air agitates and temporarily suspends the sediment thus distributing oxygen throughout the immediate vicinity of the device.

Nutrients, microorganisms or treatment chemicals such as oxidizing agents and detergents are released under pressure as liquid solutions or suspensions into the sediments from a liquid pump (not shown) via the liquid-feed line 22 and liquid-diffuser element 3. The pressure of the liquid agitates and temporarily suspends the sediment while distributing the desired substances throughout the immediate vicinity of the device.

When dry soils are to be treated, the surface of the soil is flooded with water and the device is used with the vibrator head 36 sheathed with the abrasive sock 40 firmly attached by the hose clamp 38. The vibration of the rough surface attached to the head causes compacted soil or sediment to become suspended and the device is then operated as described above.

A sonicator head is used in place of the concrete vibrator head in some cases, for example, where an emulsion is desired.

While the above description of the invention contains many specificities, the reader should not construe these as limitations on the scope of the invention, but merely as exemplifications of preferred embodiments thereof. Those skilled in the art will envision many other possible variations within its scope. For example skilled artisans will readily be able to change the dimension and shapes of the various embodiments. They will also be able to make the device of alternative materials, such as metal, ceramics, rubber or plastics. Other applications of the invention can also be envisioned for example, the extraction of metals from mill tailings or from comminuted ores could be accomplished using the present invention to facilitate chemical or microbial leaching or to desulfurize coal slurries microbiologically. The alternating aerobic and anaerobic digestion of sludge in sewage lagoons could also be facilitated inexpensively by periodic treatment with the present invention.

Accordingly the reader is requested to determine the scope of the invention by the appended claims and their legal equivalents, and not by the examples which have been given.

We claim:

1. A device for introducing materials selected from the group including gases, microorganisms, nutrients, and other chemicals, into sediments in-situ comprising:
   a multi-orificed, non-jetting aeration means for diffusing gases under pressure,
   a multi-orificed, non-jetting liquid-injection means for diffusing materials contained in liquids under pressure,
   a vibration means,
   said aeration means and said liquid-injection means being attached to said vibration means whereby vibration causes said device to penetrate the sediment while releasing gases and liquids containing said materials into the sediments without unduly dispersing said sediments.

2. The device of claim 1 in which aeration means is a gas-diffuser element connected to a compressed-air line.

3. The device of claim 1 in which the liquid-injection means is a liquid-diffuser element connected to a liquid-feed line.

4. The device of claim 1 in which the vibration means is an internal concrete vibrator.

5. The internal concrete vibrator of claim 4 in which a material providing an abrasive surface invests the vibrator head.

6. The device of claim 4 in which said aeration means and said liquid-injection means are diffuser elements attached to the power cable of said internal concrete vibrator parallel to said cable immediately proximal to the vibrator head.

7. A device for introducing gaseous oxygen under pressure into sediments in-situ comprising:
- a multi-orificed, non-jetting aeration means for diffusing gases,
- a vibration means,
- said aeration means being attached to said vibration means whereby vibration causes said device to penetrate the sediments while releasing gaseous oxygen for the stimulation of metabolic activity of microorganisms in the sediments without unduly dispersing said sediments.

8. The device of claim 7 in which said aeration means is a gas-diffuser element connected to a compressed-gas line.

9. The device of claim 7 in which said vibration means is an internal concrete vibrator.

10. The device of claim 9 in which said aeration means is a gas-diffuser element attached parallel to the power cable of said internal concrete vibrator immediately proximal to the vibrator head.

11. The device of claim 9 in which said aeration means is attached to the pneumatic hose of a pneumatic internal concrete vibrator.

12. A device for introducing nutrients and other chemicals dissolved in liquids under pressure into sediments in-situ comprising:
- a multi-orificed, non-jetting liquid-injection means for diffusing materials contained in liquids under pressure,
- a vibration means,
- said liquid-injection means being attached to said vibration means whereby vibration causes said device to penetrate the sediments while releasing nutrients and other chemicals which stimulate metabolic activity of microorganisms and the dissolution and degradation of target substances in the sediments and in surface water circulated through the sediment via the device without unduly dispersing said sediments.

13. The device of claim 12 in which said liquid-injection means is a liquid-diffuser element connected to a liquid-free line.

14. The device of claim 12 in which said vibration means is an internal concrete vibrator.

15. The device of claim 14 in which said liquid-injection means is attached parallel to the power cable of said internal concrete vibrator immediately proximal to the vibrator head.

16. A device for introducing chemicals contained in liquids under pressure into sediments in-situ comprising:
- a multi-orificed, non-jetting liquid-injection means for diffusing chemicals contained in liquids,
- a vibration means,
- said liquid-injection means being attached to said vibration means whereby vibration causes said device to penetrate the sediment while releasing chemicals for the degradation and dissolution of target substances in the sediments without unduly dispersing said sediments.

17. The device of claim 16 in which said liquid-injection means is a liquid-diffuser element connected to a liquid-feed line.

18. The device of claim 16 in which said vibration means is an internal concrete vibrator.

* * * * *